March 10, 1959     I. B. CHANDLER     2,876,753
MANUALLY CONTROLLABLE AUTOMOBILE GOVERNOR
Filed Feb. 9, 1954
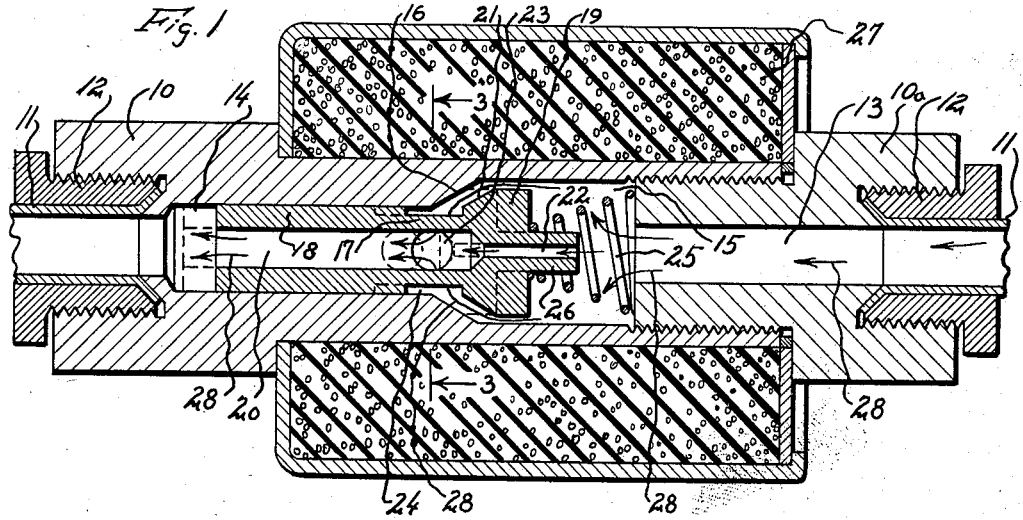
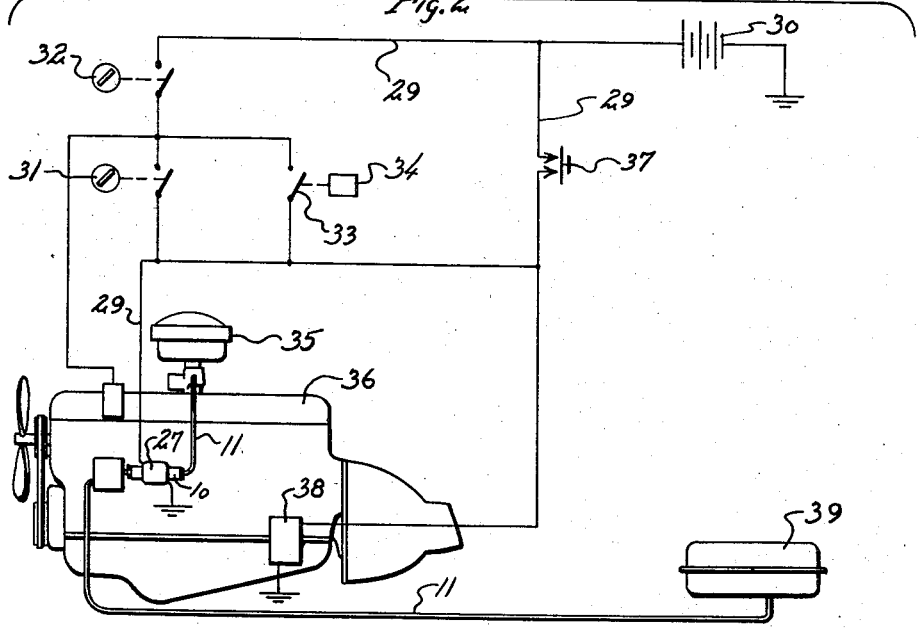
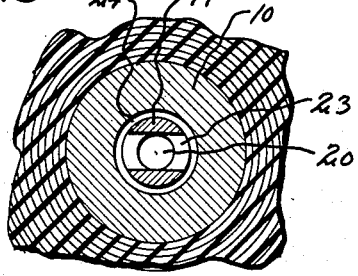
INVENTOR
IRVIN B. CHANDLER
BY Williamson, Williamson,
Schroeder & Adams
ATTORNEYS

United States Patent Office 2,876,753
Patented Mar. 10, 1959

2,876,753

MANUALLY CONTROLLABLE AUTOMOBILE GOVERNOR

Irvin B. Chandler, Mankato, Minn.

Application February 9, 1954, Serial No. 409,068

2 Claims. (Cl. 123—102)

This invention relates to combustion engine governors and more particularly to a controllable flow-restricting valve operating in the fuel supply system.

One of the trends in the design of modern motor cars is toward large and extremely powerful engines. Although these powerful engines have their advantages, they make the modern automobiles a dangerous piece of equipment to use. This is especially true if the driver of the automobile has less than a normal sense of responsibility, or if the driver does not realize the extent of the power available in the automobile. Such drivers are very apt to create situations which endanger not only the safety of his own life and of the car he is driving, but the safety of others and their property. Many of these situations are related directly to such driver's uncontrolled use of the maximum power available in the engine of the car. Some of these situations may be created by overtaking another car in the face of oncoming traffic, by making a fast start or get-away from a stop sign and then crossing a dangerous intersection, and by using excessive speeds when traffic, road, and weather conditions do not safely permit it.

On the other hand, the powerful engines of the modern cars may be advantageously and safely used by experienced drivers. But as a general rule, every automobile is driven by both inexperienced drivers who are not sufficiently careful to control the use of the power available as well as those who are qualified to safely handle such a high powered vehicle. The owner of the car, of course, likes to be able to drive it as he chooses, but at the same time he may desire to place limitations on the power available to others who may drive his car. Such is the case where the father of a family wishes to have a powerful car for his own use, but would like to limit the power available in the car when his teen-age youngsters are driving.

Heretofore, governors have been known which limit the maximum speed of an automobile. They have no effect on engine operation until a predetermined engine speed is reached, at which time such governors limit the maximum speed of the engine. Maximum power of the engine is available until a predetermined engine speed is reached. Therefore, even if such a governor is installed on a car, maximum engine power is available at low speeds for a high rate of acceleration in fast get-aways and quick starts. Common experience teaches why this fast acceleration is dangerous. Such fast automobile acceleration is also one of the chief causes of engine wear, and is, therefore, undesirable.

But more than that, the major disadvantage of such known governors, as applied to automobiles, is that they completely lack the feature of easy and quick controllability to facilitate selectively rendering the governor operative or inoperative. When such a governor is installed, it is adjusted with special tools to operate after a certain engine speed is reached. Without such special tools its operation cannot be varied. It operates every time the prefixed engine speed is reached. With such governors, in order for the owner of a car to limit the power and speeds available to others who drive his car, he also limits the power and speeds available to himself. He cannot himself easily avoid the limitations of the governor. This is one of the major reasons that governors have not been commonly used in family-type automobiles.

A general object of my invention is to provide a governor by which the owner of a car may limit the maximum power output for restricting not only the top speed, but also the rate of acceleration available to others who drive his car, but may have the maximum performance and power output of the engine when he drives the car.

Another object of my invention is to provide in an automobile governor the feature of easy controllability to selectively render the governor operative or inoperative at the discretion of the owner.

If the owner of an automobile is to have a governor to alter the driving habits of others who drive his car, and to thereby aid in protecting his property and the lives and properties of others from injury, the governor must operate at low vehicle speeds to limit the rate of acceleration as well as at high speeds to restrict the top speed of the vehicle.

Therefore, still another object of my invention is to provide a governor for an automobile which will limit the power available from the engine and also limit the maximum rate of acceleration thereof at low speeds as well as limiting the top speed of the car.

Still another object of my invention is to provide a conveniently releasable mechanism operating in the liquid fuel flow line between fuel storage tank and the engine which will restrict the flow of liquid fuel to the engine.

A further object of my invention is to provide, along with a governor operating in the liquid fuel flow line of a motor car, an electrical control for the governor and locking switch which will control whether or not the governor will place operational limitations on the engine.

A still further object of my invention is to provide a governor for an automobile which may be easily installed.

A still further object of my invention is to provide a highly novel and improved governor of inexpensive and simple construction and operation for an automotive-type engine.

These and other objects and advantages of my invention will more fully appear in connection with the following description made in connection with the accompanying drawings wherein like reference characters refer to the same parts throughout the several views and in which:

Fig. 1 is a cross-sectional view of the flow-restricting valve structure showing it connected to the fuel flow line;

Fig. 2 is a diagrammatic view of the fuel supply system of an automobile and a schematic diagram of the electrical control circuits for the flow-restricting valve; and Fig. 3 is a cross-sectional view of the valve structure taken at 3—3 in Fig. 1.

An embodiment of my invention includes a flow-restricting valve, as shown in Figs. 1 and 3, which comprises a rigid hollow body member 10 made of corrosion-resisting, non-ferrous metal material and a hollow plug 10a which is made of ferrous metal and is affixed to the body member 10 by screw threads. The tubular fuel flow line 11 is attached to the body member 10 and plug 10a by suitable means, such as bushings 12 which are attached to the body member 10 and plug 10a by means of screw threads. The hollow plug 10a has an inlet passage 13 extending longitudinally therethrough. An outlet passage 14 extends longitudinally through one end of the hollow body member 10 and an enlarged valve chamber 15 is located medially between the ends of the body member 10. Inlet chamber 13, outlet chamber 14 and enlarged valve chamber 15 define an intercommunicating conduit through the body member 10 and plug 10a. At one end of the enlarged valve chamber 15 is an annular seat 16 forming a surface on said body member 10 and tapering in a frusto-conical manner from the walls of the enlarged valve chamber to a smaller diameter at the juncture of the surface with the outlet passage 14. The surface comprising annular seat 16 is smooth so at to engage another surface in fluid-sealing relationship.

A valve element 17 or valve plunger is mounted partially in the outlet passage 14 and partly in the enlarged valve chamber 15 of the body member 10, and is made of a corrosion-resistant, ferrous metal material. The valve element 17 is cylindrically shaped in its body portion 18 and has an enlarged valve-head portion 19. An opening 20 extends through the body portion 18 of the valve element 17 and longitudinally thereof. The body closely fits within the passage 14 in slidable relation therein to substantially prevent liquid flow between the passage wall and the body 18.

The valve-head portion 19 is mounted in the enlarged valve chamber 15 and has its periphery in spaced relationship with the walls of the valve chamber 15. The valve-head portion 19 has an annular surface 21, the one end thereof adjacent to the body portion 18. The surface 21 is tapered frusto-conically from a small diameter adjacent the body portion 18 to a larger diameter medially of the valve-head portion 19 and is of similar configuration as the annular seat 16 so as to engage seat 16 of body member 10 in fluid-sealing relationship when the valve member 17 is shifted longitudinally of body member 10 toward the outlet passage 14 thereof. An opening 22 extends longitudinally of valve member 17 through valve-head portion 19 and communicates with the opening 20 of the valve element 17. Opening 22 is of a small predetermined size as compared to the size of the inlet passage 13 and the tubular flow line 11 so as to be restrictive to flow of liquid fuel passing therethrough.

Extending transversely through the valve element 17 and substantially medially of the ends thereof is an opening 23 of such size as to be able to carry a flow of liquid fuel equal to the flow capacities of opening 20 of valve element 17 and inlet passage 13 of body member 10. The valve element 17 has a shallow annular recess 24 in its periphery adjacent said transverse opening 23 and adjacent the tapering annular surface 21 of the valve-head portion 19.

A compression spring 25 is mounted in enlarged valve chamber 15 and engages the inner end of the plug 10a opposite annular seat 16 and engages the end of valve element 17 and is held in position thereon by means of a nipple 26 which is integral of valve member 17. Compression spring 25 exerts a force on and forcibly projects valve member 17 into the outlet passage 14 of the body member 10 and to cause surface 21 of the valve-head portion 19 and annular seat 16 to engage in fluid-sealing relationship therebetween. When the valve element 17 is so projected, flow of liquid fuel will pass through the flow-restricting opening 22 and through outlet opening 20 of valve element 17. This position of the valve element 17 thereby causes the flow of liquid fuel to be restricted as compared with the flow capacity of the tubular flow line 11 and inlet passage 13

A coil or solenoid 27 is wound circumferentially around and engaged with the non-ferrous metal body member 10. The ferrous metal plug 10a and the ferrous metal valve element 17 comprise a core for the solenoid. When the solenoid is energized, its lines of flux pass through plug member 10a and valve element 17 and cause a force to be exerted upon valve element 17 toward said plug member 10a and opposite in direction to and of greater magnitude than the force exerted by spring 25, and thereby cause valve element 17 to shift in a direction longitudinally of the body member 10 and toward the inlet passage 13 and away from outlet passage 14. This movement of valve element 17 causes annular seat 16 and annular surface 21 of the valve-head portion 19 to be disengaged and positioned in spaced relationship, thereby allowing flow of liquid fuel to pass therebetween, through the annular recess 24, through transverse opening 23 and through opening 20 of valve element 17 as shown by the arrows indicated as by character 28 as well as through flow-restricting opening 22. When the valve element 17 is shifted by the action of solenoid 27, the flow resulting through valve element 17 will be substantially equal to the flow capacity of flow line 11 and inlet passage 13.

One end of the coil winding 27 is grounded to the car frame and the other end of the solenoid winding is attached to an electric circuit 29 which is attached to the battery 30 or source of potential of the automobile through switches.

A key-operated locking switch 31 is connected in circuit 29 and in series with key-operated ignition switch 32. Switch 31 controls the energization of coil 27, and shifting of the flow-restricting valve element 17, however, closing of control switch 31 will have no effect unless ignition switch 32 is closed.

It is often desirable, in operation of the car, to provide unrestricted flow of fuel to the engine under adverse operating conditions. I provide a switch 33 which is controlled by a device 34 which is responsive to engine temperatures and will operate to close switch 33 and thereby allow unrestricted fuel flow to the carburetor 35 and the engine 36 when the engine is cold, and switch 33 will open after the engine is warmed and valve element 17 will shift back to flow-restricting position. The heat-responsive device 34 may be a thermally-operated switch of known construction. Closing of switch 33 is also ineffective to operate solenoid 27 unless the ignition switch 32 is closed. Starter switch 37 is connected in circuit 29 parallel to and bypassing key-operated switches 31 and 32 and thermoswitch 33. When the starter switch 37 is closed to operate the engine starter 38, the solenoid will operate and allow an unrestricted flow of liquid fuel in the fuel line 11 between fuel supply reservoir 39 and engine 36, so as to provide the engine with ample fuel at time of starting.

In normal operation, the ignition switch 32 will be closed and provide electric potential to the terminals of switches 31 and 33. If the engine is cold, switch 33 will be closed and the solenoid will be energized to allow a non-restricted flow of fuel through the valve structure and fuel line. After the engine is warmed, switch 33 will open and the solenoid will be de-energized and the spring 25 will force the valve element 17 into flow-restricting position and will allow only a restricted flow of fuel through the valve structure and fuel line. Closing of switch 31 will energize the solenoid and shift the valve element into non-restricting position and thereby allowing the normal flow of liquid fuel through the fuel line into the engine. If the switch 31 is opened, the solenoid will be de-energized and the valve will shift to flow-restricting position, and, if the key of the switch is then removed, the valve will be maintained in flow-restricting position, except for temporary operation of thermal-switch 33 and starter switch 37 and the flow through the valve structure and flow line will be restricted. This will maintain a limit on the maximum speed and horsepower that can be developed in the engine.

It will be seen that I have provided a governor for an automobile which operates to limit the rate of flow of liquid fuel through the fuel flow line into the carburetor or engine and will not allow the fuel to flow to the full capacity of the flow line. By so limiting the flow of the liquid fuel to the engine, the engine cannot attain its maximum rated horsepower output and, therefore, it cannot drive the automobile at maximum speed, and the automobile and engine cannot be accelerated at the normal maximum rate as without a fuel flow restriction.

It should also be noted that the provision of a switch-controlled solenoid circuit which controls the position of the restricting valve, permits the governor to be easily and quickly rendered operative or inoperative by the owner of the car. By providing a key-locking switch 31 of any conventionally known type, the automobile owner may at will energize the solenoid winding 27 to permit unrestricted liquid fuel flow to the carburetor or, by locking the switch in open position with the solenoid winding, of course, de-energized, may cause the valve to remain in its normal flow-restricting position. The ease of controllability of the governor to selectively render the same operative or inoperative, as well as the ease with which the governor can be quickly installed in any conventional motor car, are extremely important advantages of my invention as disclosed herein.

It will, of course, be understood that various changes may be made in the form, details, arrangement and proportions of the parts without departing from the scope of my invention.

What I claim is:

1. For use in a liquid fuel supply system for an automotive engine of the type having a fuel supply reservoir, and an engine, and a fuel flow line interconnecting such a reservoir and engine, a liquid fuel-limiting governor having in combination a partially closable, flow-restricting valve being adapted to be placed in the fuel flow line and being shiftable to non-restricting position to allow unrestricted fuel flow, spring action mechanism engaging said valve holding the same in flow-restricting position, electric circuit and solenoid means being operatively associated with said valve for shifting the same when energized into non-restricting position to allow unrestricted flow of fuel and including a control switch and an engine-heat-responsive switch connected in parallel with said control switch and being adapted to energize said electric solenoid means when the engine temperature is below a predetermined level and thereby allow unrestricted fuel flow in such a fuel line at times of low engine temperatures.

2. For use in a liquid fuel supply system for an internal combustion engine of the type having a fuel supply reservoir, and an engine and a fuel flow line interconnecting the reservoir and engine, a liquid fuel-limiting governor comprising a partially closed flow-restricting valve adapted to be placed in the fuel flow line and being shiftable to non-restricting position to allow unrestricted flow, and an electric circuit and solenoid means including an engine heat-responsive switch operatively associated with said valve for restricting flow therethrough until the engine is at a predetermined temperature.

References Cited in the file of this patent

UNITED STATES PATENTS

| | | |
|---|---|---|
| 627,623 | McCoy | June 27, 1899 |
| 1,036,479 | Flamm | Aug. 20, 1912 |
| 1,786,063 | Gumpper | Dec. 23, 1930 |
| 1,838,409 | King et al. | Dec. 29, 1931 |
| 2,164,114 | Kolb | June 27, 1939 |
| 2,174,972 | Dach | Oct. 3, 1939 |
| 2,267,272 | Barraja-Frauenfelder et al. | Dec. 23, 1941 |
| 2,546,325 | Wasserlein | Mar. 27, 1951 |
| 2,611,351 | Horner | Sept. 23, 1952 |
| 2,685,871 | Block | Aug. 10, 1954 |
| 2,687,277 | Bremer et al. | Aug. 24, 1954 |
| 2,705,944 | Powell | Apr. 12, 1955 |
| 2,712,814 | Harr | July 12, 1955 |